UNITED STATES PATENT OFFICE.

HARRY A. KENNEDY, OF CLEARFIELD, PENNSYLVANIA.

SILICIOUS FIRE-BRICK AND METHOD OF MAKING THE SAME.

1,260,398.

Specification of Letters Patent.

Patented Mar. 26, 1918.

No Drawing.

Application filed September 26, 1917. Serial No. 193,852.

*To all whom it may concern:*

Be it known that I, HARRY A. KENNEDY, a citizen of the United States, residing at Clearfield, in the county of Clearfield and State of Pennsylvania, have invented certain new and useful Improvements in Silicious Fire-Bricks and Methods of Making the Same, of which the following is a specification.

Heretofore in the manufacture of refractory brick from silica rock and fire clay, the silica rock was crushed or ground to the desired fineness, and this crushed material was then mixed with fire clay or a suitable binder and molded into the blocks or bricks, or the crushed silica rock and fire clay were ground together and molded. I have found that such bricks will melt at a comparatively low temperature by reason of the fact that the fine silica or sand which is molded into the brick along with the coarser grade of material will readily flux or combine with the fire clay or other binder.

My invention overcomes this difficulty and produces material of this character which will stand a much higher heat than ordinary fire bricks, without fluxing.

My invention, broadly stated, consists in using silica which is free from the finely powdered silica or sand, and mixing this coarser grade of material with the fire clay or other binder while in its coarse condition. Owing to the absence of the fine sand or powdered material, the bricks or blocks thus formed will stand a considerably higher heat than formerly.

In carrying out my invention, in its preferred form, the silica rock is crushed or broken to a convenient size, such as egg size, or larger, and then delivered to a rolls crusher (any well known type) with sufficient maximum space between the rolls, to further reduce the particles to one-half to three-quarter inch size. It is then further reduced in the same manner by having the rolls set to the final or desired maximum size, say for all ordinary purposes one-quarter inch. This material is then run over a #10 shaker screen and all that passes through same separated from the coarser granules, which coarser particles are then ready for mixing with the fire clay or other binder.

The finer portions thus separated may be used in the manufacture of silica brick, cement, or fire brick of lower grade and less refractory quality.

While the size of silica particles above named will give best results for general requirements, yet these sizes may be materially changed according to particular uses; for example, if the bricks are to be subjected to considerable friction or abrasive action, smaller particles should be used, and where little or no friction is put to them, and higher refractoriness wanted, they should be made coarser.

The fire clay may be prepared by any of the usual methods, but I prefer to pass it through a wet chaser pan in which it is ground to the proper consistency for fire brick and then removed to a pug mill or mixing device wherein the coarser particles of silica are added and the materials thoroughly mixed, ready for molding or applying in the furnace. It is of the utmost importance that the properly sized silica should be mixed with the other materials or the binder in such a way that it is not pulverized or reduced to a smaller size, as even a small amount of very fine silica or sand detracts from the refractory quality of the brick. The amount of the binder, whether composed of plastic fire clay or any of the other bonds now used for refractory brick, depends upon the conditions to which it is to be subjected, but where a highly refractory material is desired and the material is to be subjected to a small amount of friction, the amount of binder is reduced to as small an amount as possible, or may be dispensed with altogether by finer grinding of the fire clay as a mass, and thus making the consistency such that it is a sufficient binder of itself; only enough binder in any case being used to make the brick strong enough for the purpose intended, and to withstand handling, transportation, etc. The prepared material is then molded into bricks and burnt.

The advantages of my invention result from the facts which I have discovered, that by using only the coarser particles of silica and separating them from the finely powdered particles or sand, the usual fluxing action between fire clay and finely divided particles of free silica when subjected to high temperature does not occur, and as the coarser silica particles prevent the fire clay from shrinking, by their own expansion under high temperature, the result is a considerable higher refractoriness, since the silica is added in a comparatively pure state and together with its expansion retains the air cells of the entire mass for a longer period of time. And further, since silica in this form improves the refractoriness, the question of expansion or contraction of the bricks may be regulated completely by the amount and size of the granules of silica added, which for most purposes is of the utmost importance.

Many changes may be made in the method of obtaining the graded silica particles, as well as in the binder used, and the method of combining them, without departing from my invention.

I claim:

1. Silica brick composed of silica particles of substantial size as described, free from the finely powdered silica or sand and mixed with a binder, substantially as described.

2. The method of making refractory brick containing free silica, consisting in reducing the silica to the desired size, separating it from the finely powdered silica or sand, and then mixing with a binder, substantially as described.

3. The method of making silica brick consisting in reducing the silica to particles of the desired size, screening this material to remove the finely powdered silica or sand, mixing the coarser particles with fire clay, and then molding and burning the bricks, substantially as described.

4. The method of making silica brick consisting in reducing silica to the desired degree of fineness, screening the coarser particles from the finely powdered silica or sand, mixing these coarser particles with fire clay without pulverization or reduction to small size, and then molding and burning the brick, substantially as described.

5. Silica brick composed of particles of silica of substantial size, as described, free from finely powdered silica, and mixed with a binder of fire clay, substantially as described.

In testimony whereof I affix my signature.

HARRY A. KENNEDY.